(12) United States Patent
Tham et al.

(10) Patent No.: US 10,668,523 B2
(45) Date of Patent: Jun. 2, 2020

(54) METHOD FOR HIGH TEMPERATURE FORGING OF A PREFORMED METAL PART, AND SHAPING EQUIPMENT SUITABLE FOR FORGING

(71) Applicant: SAFRAN AIRCRAFT ENGINES, Paris (FR)

(72) Inventors: Leon Tham, Saint Denis (FR); Mohamed Walid Khous, Montreuil (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 438 days.

(21) Appl. No.: 15/552,149

(22) PCT Filed: Feb. 9, 2016

(86) PCT No.: PCT/FR2016/050283
§ 371 (c)(1),
(2) Date: Aug. 18, 2017

(87) PCT Pub. No.: WO2016/132044
PCT Pub. Date: Aug. 25, 2016

(65) Prior Publication Data
US 2018/0043423 A1    Feb. 15, 2018

(30) Foreign Application Priority Data
Feb. 19, 2015    (FR) ..................................... 15 51403

(51) Int. Cl.
*B21K 3/04*    (2006.01)
*B21D 53/78*    (2006.01)
(Continued)

(52) U.S. Cl.
CPC ................. *B21K 3/04* (2013.01); *B21D 53/78* (2013.01); *B21J 13/02* (2013.01); *B21K 25/00* (2013.01);
(Continued)

(58) Field of Classification Search
CPC ..... B21K 3/04; B21K 21/04; Y10T 29/49336; Y10T 29/49337; Y10T 29/49339;
(Continued)

(56) References Cited

U.S. PATENT DOCUMENTS 2,544,447 A * 3/1951 Dodds .................... B21J 13/025
72/396
2,799,919 A * 7/1957 Wilder, Jr. ............. B21D 53/78
29/889.72

(Continued)

FOREIGN PATENT DOCUMENTS

WO    2011/161385 A1    12/2011
WO    2012/042164 A2    4/2012

OTHER PUBLICATIONS

International Search Report dated May 2, 2016 in PCT/FR2016/050283 filed Feb. 9, 2016.

*Primary Examiner* — Edward T Tolan
(74) *Attorney, Agent, or Firm* — Oblon, McClelland, Maier & Neustadt, L.L.P.

(57) ABSTRACT

A forging method serving to use shaping tooling suitable for high temperature forging of a preformed metal part having angular twist undercuts (49) in its final shape, the method comprising placing the preformed metal part on a movable central insert (44) of the tooling and blocking it in the tooling (40), and forming side fins of the preformed metal part (30) in their final shape by moving a movable top first die and the movable central insert in a common direction towards a stationary bottom die, the movable central insert including at least two cutaway zones (20, 52) for eliminating (Continued)

the angular twist undercuts and thus enabling the preformed metal part in its final shape to be dislodged in a single extraction direction.

8 Claims, 4 Drawing Sheets

(51) Int. Cl.
 *B21J 13/02* (2006.01)
 *F01D 5/28* (2006.01)
 *F01D 5/14* (2006.01)
 *B21K 25/00* (2006.01)

(52) U.S. Cl.
 CPC ............ *F01D 5/147* (2013.01); *F01D 5/282* (2013.01); *F01D 5/286* (2013.01); *F05D 2220/36* (2013.01); *F05D 2230/25* (2013.01); *Y02T 50/672* (2013.01)

(58) Field of Classification Search
 CPC .... B21J 5/02; B21J 5/025; B21J 13/02; F05D 2230/25; F05D 2240/31; B23P 15/02; B21D 53/78
 See application file for complete search history.

(56) References Cited

U.S. PATENT DOCUMENTS

| | | | |
|---|---|---|---|
| 3,057,393 A * | 10/1962 | Clarke | B21D 53/78 72/373 |
| 5,168,741 A * | 12/1992 | Braunheinn | B21D 13/10 29/889.72 |
| 8,256,118 B2 * | 9/2012 | Cammer | B23P 15/04 29/889.7 |
| 9,364,887 B2 * | 6/2016 | Godon | B21D 22/022 |
| 10,155,260 B2 * | 12/2018 | Abousefian | B21D 53/78 |
| 2009/0165299 A1 | 7/2009 | Cammer | |
| 2011/0010937 A1 | 1/2011 | Cammer | |
| 2013/0089428 A1 | 4/2013 | Hottier et al. | |
| 2013/0180304 A1 | 7/2013 | Leveque et al. | |
| 2014/0208819 A1 * | 7/2014 | Klein | B21D 53/78 72/361 |

* cited by examiner

METHOD FOR HIGH TEMPERATURE FORGING OF A PREFORMED METAL PART, AND SHAPING EQUIPMENT SUITABLE FOR FORGING

BACKGROUND OF THE INVENTION

The field of the invention is that of turbine engines, and in particular that of turbine engine fan blades made of composite material having leading edges that include structural reinforcement made of metal, and the present invention relates more particularly to a method of high temperature forging metal parts, such as for example metal structural reinforcement for the leading edge of a composite turbine engine blade.

Nevertheless, the invention is also applicable to making any part of complex geometrical shape and to making metal reinforcement for reinforcing a leading edge or a trailing edge of a blade in any type of turbine engine, whether for terrestrial or aviation use, and in particular in a helicopter turboshaft engine or in an airplane turbojet.

It is known to fit turbine engine fan blades that are made of composite materials with metal structural reinforcement extending over the full height of the blade and extending beyond their leading edges, as mentioned in Document EP 1 908 919 filed in the name of the Applicant. Such reinforcement makes it possible to protect the composite blade in the event of the fan receiving an impact from a foreign body, such as for example a bird, hail, or indeed grit.

In particular, the metal structural reinforcement protects the leading edge of the composite blade by avoiding any risk of delamination, of fiber rupture, or indeed of damage by loss of cohesion between fibers and the matrix. In known manner, it may be made either entirely by milling from a titanium block, which requires numerous finishing operations and complex tooling involving major manufacturing costs, or else from a preform obtained from a simple metal bar and a succession of forging steps, as described in particular in French application FR 2 961 866 filed in the name of the Applicant.

Such forging steps are nevertheless particularly complex as a result of the three-dimensional nature of the desired deformations. That is why the Applicant has developed tooling in its patent application FR 2 965 496 for hot-shaping that is referred to as "multi-effect" tooling since it makes it possible to perform deformation in three-dimensional manner (i.e. in different directions simultaneously) by means of a single-acting press (i.e. having only one working axis) that is inexpensive and under high temperature conditions, i.e. temperatures higher than 850° C. (about 940° C. for making titanium reinforcement).

Although that method generally gives satisfaction in terms of its rapidity and its simplicity, it nevertheless presents certain drawbacks at the end of the operation as a result of angular twist undercuts that exist all along the part that is to be made and that require dislodging movements to be performed in several directions, which can be a source of defects in the part.

OBJECT AND SUMMARY OF THE INVENTION

A main object of the present invention is thus to mitigate such drawbacks by proposing a method of forging a preformed metal part having angular twist undercuts in its final shape, the method comprising the following steps:

placing said preformed metal part on a movable central insert of said tooling, the insert including at least two cutaway zones in order to eliminate said angular twist undercuts;

blocking said preformed metal part in said tooling;

shaping side fins of said preformed metal part into its final shape by causing a first die and said movable central insert to perform relative movement along a common direction towards a second die; and dislodging said preformed metal part in its final shape in a single extraction direction.

Thus, with such dislodging performed in a single direction only, any risk of the part being deformed, as is observed in the prior art tooling, is avoided.

Preferably, said metal part includes a stud at each of its two ends, and said metal part is blocked in said tooling by embedding one of said two studs and by pivoting the other one of said two studs.

Advantageously, the movement of said movable central insert is guided by the movement of said first die and said single extraction direction is perpendicular to said common direction for movement.

Preferably, said at least two cutaway zones comprise at least two truncated portions made at the two ends of said movable central insert.

Advantageously, said first die is a stationary bottom die and said second die is a movable top die.

The invention also provides a shaping tooling suitable for high temperature forging of a preformed metal part obtained by the above-specified forging method.

BRIEF DESCRIPTION OF THE DRAWINGS

Other characteristics and advantages of the present invention appear from the following description made with reference to the accompanying drawings which show an embodiment having no limiting character, and in which.

DETAILED DESCRIPTION OF AN EMBODIMENT

Figure 1:
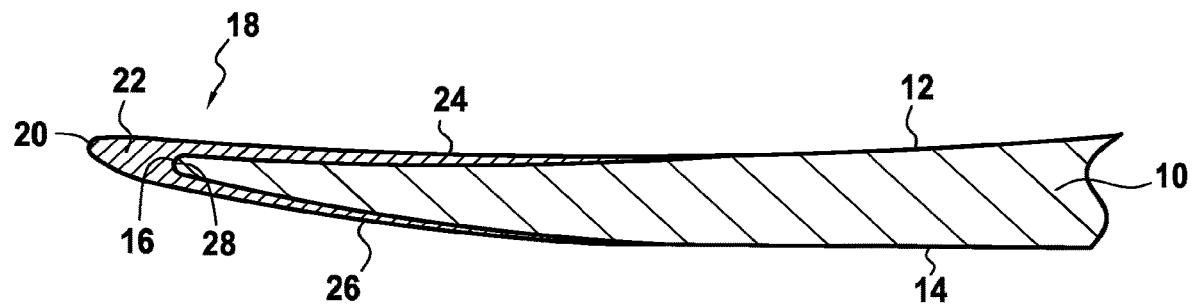
FIG. 1 is a section view of the leading edge of a composite material fan blade, showing its metal structural reinforcement.

FIG. 1 is a fragmentary section view of a composite blade including metal structural reinforcement of its leading edge obtained by means of the forging method of the invention. By way of example, the blade 10 shown is a moving fan blade of a turbine engine (not shown) extending between a leading edge and a trailing edge from a blade root to a tip of the blade, typically obtained by draping (filling adhesive bonding) a woven composite material. By way of example, the composite material used may be made up of an assembly of woven carbon fibers and a resin matrix, the assembly being formed by molding by means of a conventional vacuum resin injection method of the resin transfer molding (RTM) type.

The pressure side surface 12 and the suction side surface 14 form the side faces of the blade 10 connecting together the leading edge 16 and the trailing edge (not shown) of the blade 10. In known manner, the blade 10 has structural reinforcement 18 made of metal that is preferably based on titanium (because of its great capacity for absorbing the energy due to impacts) that is adhesively bonded on its leading edge 16, with the reinforcement matching the shape of the leading edge and extending it so as to form a leading edge 20 referred to as the leading edge of the reinforcement. The metal structural reinforcement is bonded on the blade 10 by means of an adhesive known to the person skilled in the art, such as for example a cyano-acrylic adhesive or indeed an epoxy adhesive.

In conventional manner, the metal structural reinforcement 18 is a single-piece part having a section that is substantially V-shaped presenting a web 22 forming the leading edge 20 and extended by two flanges 24 and 26 that fit closely respectively to the pressure side 12 and to the suction side 14 of the blade 10. The flanges 24, 26 present a profile that tapers or thins going towards the trailing edge of the blade. The web 22 has an internal profile 28 that is rounded and suitable for fitting closely to the rounded shape of the leading edge 16 of the blade 10.

Figure 2:
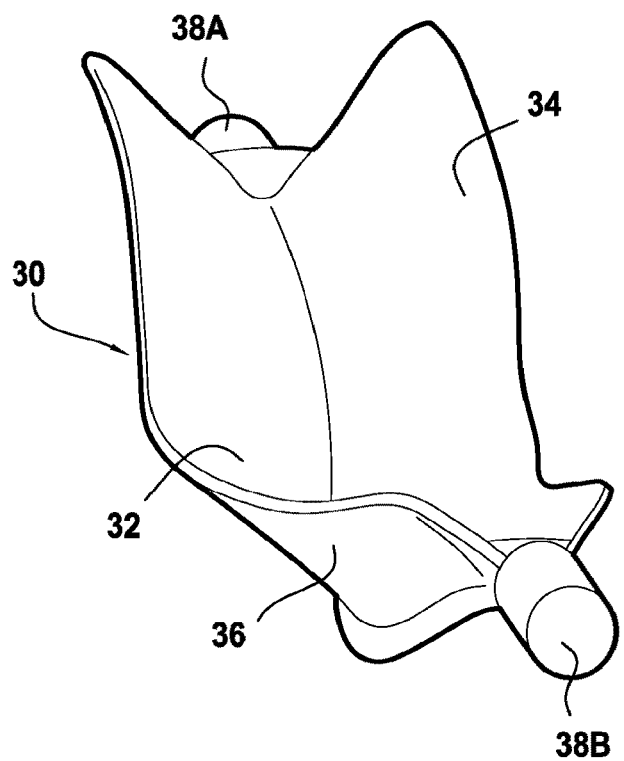
FIG. 2 is a perspective view of the preformed metal part used for making the FIG. 1 metal structural reinforcement prior to performing the forging method of the invention.

The forging method of the invention makes it possible to finalize making metal structural reinforcement as shown in FIG. 1 (the reinforcement being shown in its final state mounted on the turbine engine fan blade 10), starting from a preformed metal part 30 as shown in perspective in FIG. 2.

As is known from the first step of the method of above-mentioned application FR 2 961 866, the preformed metal part 30 is obtained from a metal bar of circular section and of diameter and length that are a function of the desired blade. The bar is initially deformed in two directions in order to obtain a double camber, by means of an isothermal pressure at a temperature lying in the range 700° C. to 940° C. (for a bar made of titanium). Thereafter, the bar as twisted in this way is subjected to die-pressing by means of a hydraulic or screw press at a temperature of about 940° C., prior to being shaped by indirect extrusion by means of a punch (or a plurality of punches, depending in particular on the quantity of material to be extruded), the dies having a V-shape corresponding to the internal final shape of the internal profile 28 of the web 22 of the metal reinforcement 18, the rounded shape complementary to the shape of the leading edge 16 of the blade 10.

At the end of these steps prior to the forging method of the invention, the preformed metal part 30 is a fabrication intermediate of substantially V-shape (or more exactly Y-shape) having two side fins 32, 34 forming between them an angle lying in the range 60° to 90° and extending from a solid nose 36 corresponding substantially to the final shape of the web 22 of the metal structural reinforcement 18. The thicknesses of the side fins present a profile that tapers going away from the nose in order to match the pressure side and suction side faces of the blade.

At the two ends of the part 30, ducts 38A and 38B coming from the initial bar serve to facilitate handling of the part.

FIGS. 3A to 3F show the various steps of making the metal structural reinforcement 18 by forging from the preformed metal part 30 obtained from the above-mentioned step, by using shaping tooling suitable for high temperature forging of the part. The purpose of the tooling is to move the lateral fins 32 and 34 towards each other so as to reduce the angle between them in order to obtain the desired final shape. In a closed enclosure 40 (see FIG. 4) at a temperature lying in the range 750° C. to 850° C., the tooling makes use of a first die 42, a movable central insert 44, and a second die 46. The first die is advantageously a stationary bottom die and the second die is advantageously a movable top die, without this configuration being limiting, the important point being to obtain relative movements of approach between the first and second dies about the central insert.

Figure 3A:
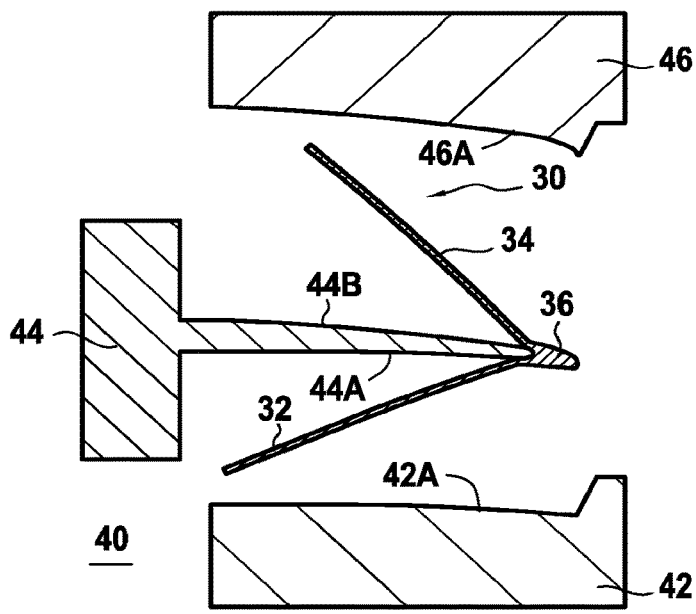
FIGS. 3A to 3F show the corresponding positions of the shaping tooling used for performing the forging method of the invention.

As shown in FIG. 3A, in the first step of the method of the invention, the movable central insert 44 being located in a "high" first position, the preformed metal part 30 is initially put into place on the inset so as to come into contact with the internal portion of the nose 36 and it is then blocked at the ends, e.g. by means of a connection comprising firstly the first stud, e.g. the stud 38A at the bottom of the blade being embedded in the structure of the forming tooling (the enclosure 40), followed by pivoting of the second stud, i.e. the stud 38B at the top of the blade, so as to ensure that the studs are coaxial while enabling the positioning to be statically determined.

Figure 3B:
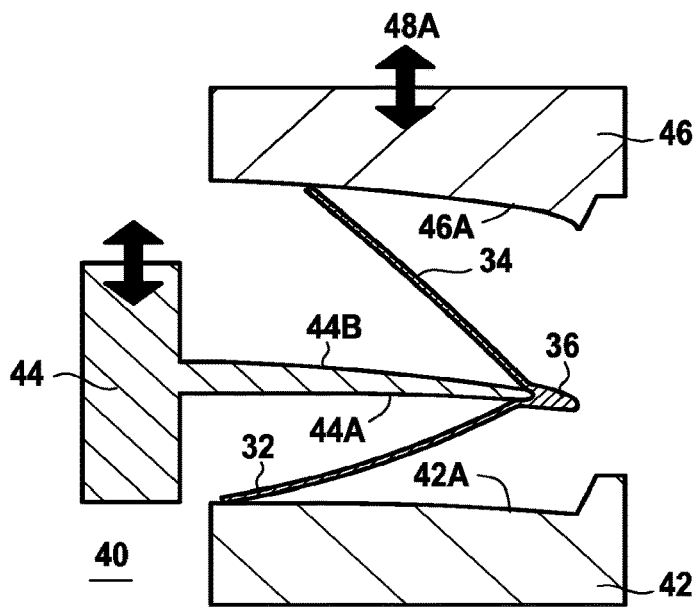

FIG. 3B shows the following step of the method in which the movable central insert 44 and the movable top die 46 are moved, optionally simultaneously, towards the stationary bottom die 42 in a travel direction 48A (vertical in the drawing) so as to engage the shaping of the first side fin 32 closing the opening angle of this first side fin little by little by approaching the insert towards the bottom die. When the movement is simultaneous, the movement of the insert is advantageously guided by the movement of the movable top die.

Figure 3C:
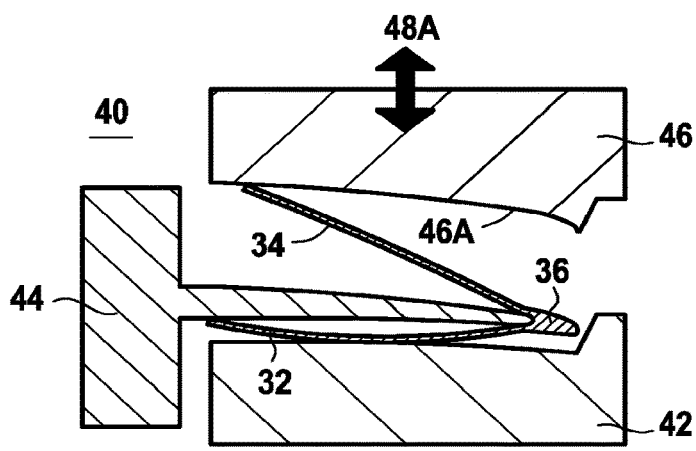

In the following step of FIG. 3C, the movement of the movable central insert 44 is stopped in an "intermediate" position enabling the first side fin 32 engaged between this insert and the stationary bottom matrix 42 to be partially shaped. Simultaneously, the movement of the movable top die 46 continues or begins depending on whether or not this movement has already started, so as to start shaping of the second side fin 34 by closing the V angle of the second side fin little by little, this time by moving the top die towards the insert. The purpose of the partial shaping is to avoid residual deformation and destruction of the tool, and the degree of closure that is selected depends on various parameters including the forming temperature, and the characteristics of the materials forming the tool and the part.

Figure 3D:
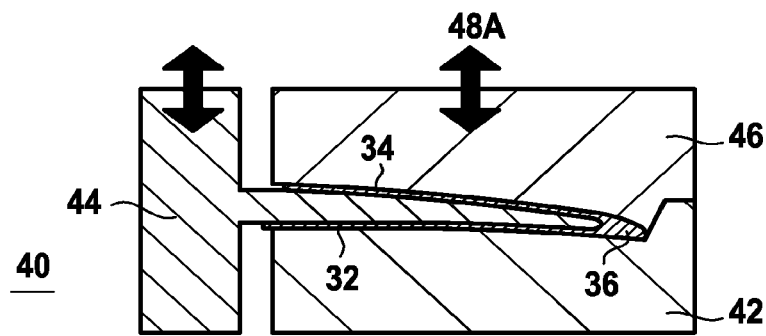
Figure 3E:
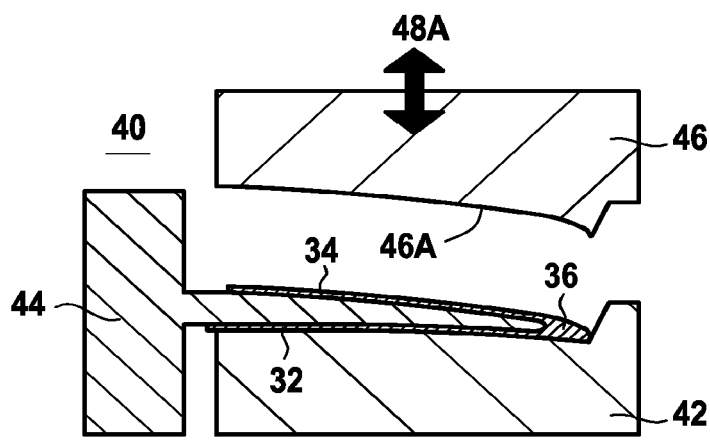
Figure 3F:
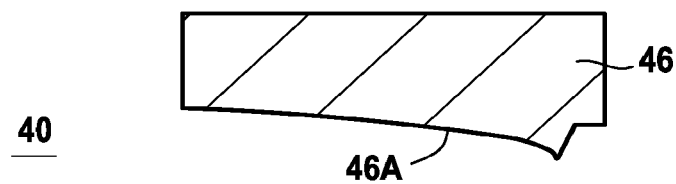
Figure 3F:
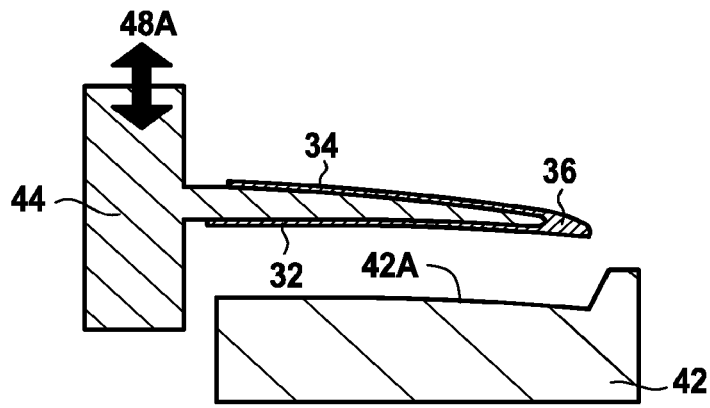

In the following step of FIG. 3D, the movement of the movable central insert 44 is restarted in the direction 48A towards a "low" final position so that when accompanied by continuing movement of the movable top die 46 in the same direction, the first and second side fins 32 and 34 are shaped simultaneously (no longer partially but fully) so as to fit exactly against the internal outline of the forming tooling. For this purpose, the facing faces of the movable central insert 44A and of the bottom die 42A are naturally shaped so as to leave between them only the space needed for receiving the first lateral fin 32 of the preformed metal part in its final shape, i.e. in alignment with the nose 36. Likewise, the top wall 44B of the movable central insert and the bottom wall 46A of the movable top die present facing faces that are shaped so as to leave between them only the space necessary for forming the second side fin 34 of the preformed metal part in its final shape. In this total shaping position, it should be observed that the tooling is kept closed against the part for several minutes in order to avoid any risk of the part returning elastically.

At the end of these forging steps, the preformed metal part 30 presents the final Y shape of the metal structural reinforcement 18 with its two flanges 24, 26 extending from its web 22 and having between them the final angle required by the technical specifications. All that then remains to be done is to move in succession the movable top die 46 (FIG. 3E) and then the movable central insert 44 (FIG. 3F) along the common travel direction 48A (in the opposite direction to their preceding movements) in order to enable the metal structural reinforcement to be extracted (preferably while hot), with this extraction taking place in a direction perpendicular to the common movement direction.

Figure 4:
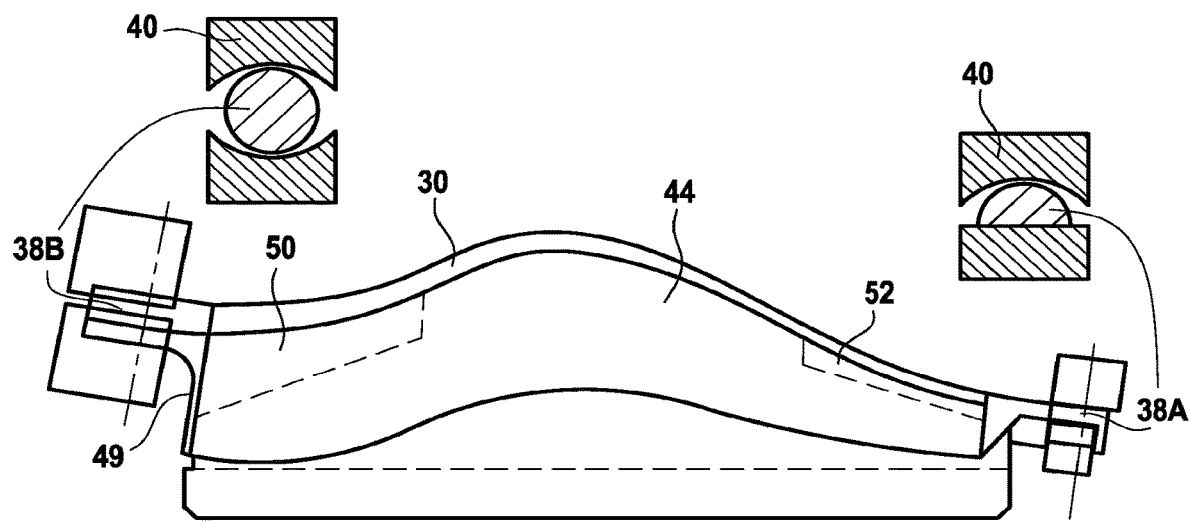
FIG. 4 shows the preformed metal part in place on its truncated insert and how it is held in position in the shaping tooling.
Figures 5A, 5B:
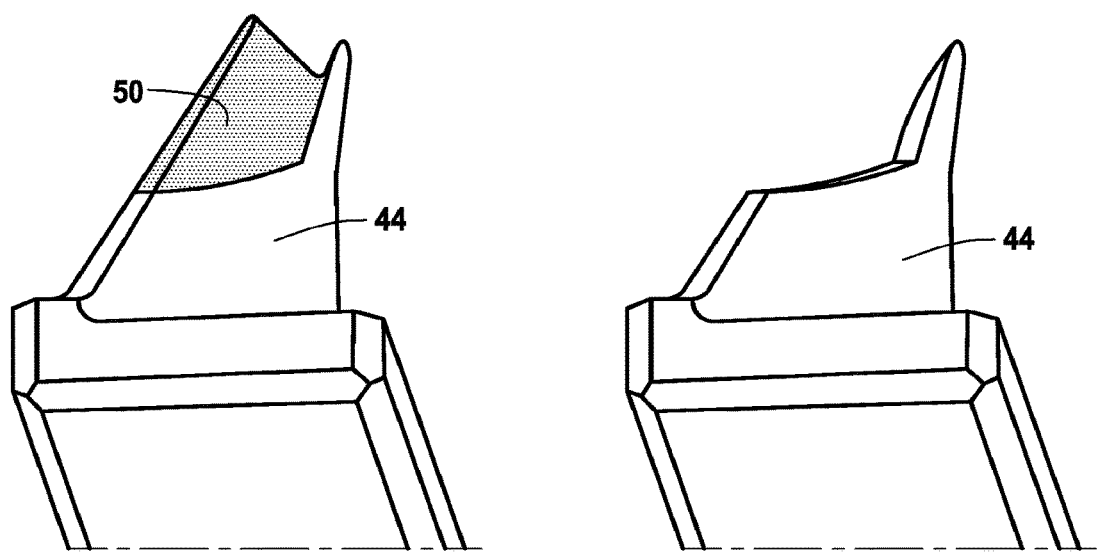
FIGS. 5A and 5B are fragmentary perspective views before and after cutting off an end portion of a truncated insert.

Nevertheless, given the presence of angular twist undercuts (see for example reference 49 in FIG. 4), that might lead to unwanted deformation of the side fins, this extraction is advantageously facilitated by truncating the insert in one or more particular parts in order to eliminate these angular twist undercuts that exist all along the part. In the strike plane, various cutting zones may be preferred. Thus, the central insert 44 as shown in FIG. 4 with the part 30 overlying it has at least two cutaway zones 50 and 52 at its two ends. The truncated portion 50 for avoiding the undercut 49 can be seen more clearly in FIG. 5A, whereas FIG. 5B shows the central insert in its final shape with this portion missing.

With this truncated insert configuration, removing the part from the central insert while hot is greatly facilitated since there is no longer any need to perform small dislodging movements in order to extract the part by attempting to follow its three-dimensional profile, with dislodging taking place simply, merely by moving in a single extraction direction.

Finally, in order to obtain the metal structural reinforcement ready for use, all that remains to be done is to cut off the studs 38A and 38B from the two ends of the part, and where necessary to perform a certain amount of finishing machining. Likewise, and depending on its utilization, a boron nitride protective layer may be deposited on the movable central insert beforehand in order to obtain better sliding, and once extracted, the metal structural reinforcement may be polished in order to obtain better rendering.

It should be observed that although the method of the invention is described mainly for metal structural reinforcement based on titanium, it is naturally equally applicable to materials based on nickel or indeed steel at temperatures that are appropriate for those alloys.

It should also be observed that although the invention is described more particularly with reference to forging metal reinforcement for a composite turbine engine blade, it is clear that it could also apply to metal reinforcement for a metal turbine engine blade. Likewise, although the invention is more particularly described with reference to metal reinforcement for a leading edge of a turbine engine blade, it is also applicable to making metal reinforcement for a trailing edge of a turbine engine blade.

The invention claimed is:

1. A forging method using shaping tooling suitable for high temperature forging of a preformed metal part having angular twist undercuts, the method comprising:
    placing said preformed metal part on a movable central insert of said tooling, said movable insert including at least two cutaway zones for eliminating said angular twist undercuts;
    blocking said preformed metal part in said tooling;
    shaping side fins of said preformed metal part by causing a first die and said movable central insert to perform relative movement along a common direction towards a second die to obtain a Y shaped metal part; and
    dislodging said Y shaped metal part in its final shape in a single extraction direction.

2. The forging method according to claim 1, wherein said at least two cutaway zones comprise two truncated portions made at two ends of said movable central insert.

3. The forging method according to claim 1, wherein the movement of said movable central insert is guided by the movement of said first die.

4. The forging method according to claim 1, wherein said single extraction direction is perpendicular to said common direction for movement.

5. The forging method according to claim 1, wherein said preformed metal part includes a stud at each of its two ends, and said preformed metal part is blocked in said tooling by embedding one of said two studs and by pivoting the other one of said two studs.

6. A shaping tooling suitable for high temperature forging in an enclosure of a preformed metal part having angular twist undercuts, the shaping tooling comprising:
    a movable central insert on which said preformed metal part can be placed such that said preformed metal part can be blocked in said enclosure of said shaping tooling; and
    a first die suitable for shaping one side fin of said preformed metal part and a second die suitable for shaping another side fin of said preformed metal part to obtain a Y shaped metal part;
    wherein said movable central insert includes at least two cutaway zones suitable for eliminating said angular twist undercuts and thus enables said Y shaped metal part to be dislodged in a single extraction direction.

7. The shaping tooling according to claim 6, wherein said movable central insert has two truncated portions at its two ends.

8. The shaping tooling according to claim 6, wherein said first die is a stationary bottom die and said second die is a movable top die.

* * * * *